United States Patent
Papp

(10) Patent No.: US 6,980,086 B2
(45) Date of Patent: Dec. 27, 2005

(54) METHOD FOR OPERATING AN ANTI-THEFT SYSTEM FOR A MOTOR VEHICLE AND AN ANTI-THEFT SYSTEM

(75) Inventor: Aurel Papp, Saal (DE)

(73) Assignee: Siemens Aktiengesellschaft, Munich (DE)

( * ) Notice: Subject to any disclaimer, the term of this patent is extended or adjusted under 35 U.S.C. 154(b) by 106 days.

(21) Appl. No.: 10/205,963

(22) Filed: Jul. 26, 2002

(65) Prior Publication Data
US 2003/0141960 A1 Jul. 31, 2003

Related U.S. Application Data

(63) Continuation of application No. PCT/DE01/00377, filed on Jan. 31, 2001.

(30) Foreign Application Priority Data
Feb. 8, 2000 (DE) ................. 100 05 444

(51) Int. Cl.⁷ ............ H04Q 5/22; G01S 13/74; H04L 12/28
(52) U.S. Cl. .......... 340/10.4; 340/10.1; 340/10.3; 342/42; 370/410; 370/236
(58) Field of Search ............ 340/5.72, 5.61, 340/5.62, 5.63, 5.64, 10.1, 10.2, 10.3, 10.4, 340/10.5, 10.41, 10.42, 426, 825.69, 825.72; 370/236, 410; 342/42, 44; 235/375, 382, 235/492

(56) References Cited

U.S. PATENT DOCUMENTS

| | | | |
|---|---|---|---|
| 3,882,491 A * | 5/1975 | Mauch et al. | 340/291 |
| 3,949,297 A * | 4/1976 | Hideshima | 367/135 |
| 4,595,902 A | 6/1986 | Proske et al. | 340/63 |
| 5,280,267 A * | 1/1994 | Reggiani | 340/426.14 |
| 5,543,798 A * | 8/1996 | Schuermann | 342/42 |
| 5,552,641 A * | 9/1996 | Fischer et al. | 307/10.5 |
| 5,723,911 A * | 3/1998 | Glehr | 340/10.5 |
| 5,847,662 A | 12/1998 | Yokota et al. | 340/825.54 |
| 5,984,175 A * | 11/1999 | Popp | 235/375 |
| 6,208,239 B1 * | 3/2001 | Muller et al. | 340/426.35 |
| 6,323,566 B1 * | 11/2001 | Meier | 307/10.2 |
| 6,556,125 B1 * | 4/2003 | Rohrl | 340/5.62 |

FOREIGN PATENT DOCUMENTS

| | | | | |
|---|---|---|---|---|
| DE | 43 29 697 C2 | 10/1995 | | E05B 49/00 |
| EP | 0 521 547 A1 | 6/1992 | | B60R 25/04 |
| EP | 0 848 123 A2 | 10/1997 | | E05B 49/00 |
| EP | 0 983 916 A1 | 9/1999 | | B60R 25/00 |

* cited by examiner

Primary Examiner—Michael Horabik
Assistant Examiner—Nam Nguyen
(74) Attorney, Agent, or Firm—Baker Botts L.L.P.

(57) ABSTRACT

A method for operating an anti-theft system having a transceiver unit comprising a trigger unit and a portable code generator, comprises the steps of:
emitting a request signal by the transceiver unit upon activation of the trigger unit, and
emitting a response code signal by the code generator after reception of the request signal, wherein the request signal and the response code signal overlap for a predefined time period.

29 Claims, 5 Drawing Sheets

METHOD FOR OPERATING AN ANTI-THEFT SYSTEM FOR A MOTOR VEHICLE AND AN ANTI-THEFT SYSTEM

CROSS REFERENCE TO RELATED APPLICATION

This application is a continuation of copending International Application No. PCT/DE/01/00377 filed Jan. 31, 2001 which designates the United States, and claims priority to German application number 10005444.7 filed Aug. 2, 2000.

BACKGROUND OF THE INVENTION

The invention relates to a method for operating an anti-theft system for a motor vehicle with which access to a motor vehicle is enabled only given confirmation of authorization by means of a code generator.

In a known anti-theft system (DE 43 29 697 C2), instead of a mechanical key, the holder of the vehicle carries with him what is referred to as a code generator (for example in the form of a check card) in order to unlock his vehicle. As soon as an activation means, for example a door handle, is actuated on the motor vehicle, the vehicle-end control unit brings about the emission of a request signal. When the request signal is received by the code generator, it automatically transmits back its characteristic response code signal in order to confirm its authorization. If the response code signal is recognized as being authorized, the doors of the motor vehicle are unlocked.

What is referred to as an inquiry/response dialog takes place in an analog fashion if the user is located in the interior of the vehicle and would like to start the vehicle. Given confirmation by the code generator, the immobilizer is then released and the motor vehicle can be started.

Potential car thieves could illegally monitor the signals transmitted wirelessly between vehicle and code generator and illegally reproduce them in order to obtain unauthorized access to the motor vehicle or in order to use the motor vehicle illegally.

For this reason, in a further known anti-theft system (U.S. Pat. No. 4,595,902), not only the code generator but a second transmitter with a different radiation characteristic is also used, the code signal of said second transmitter being, however, not intended to be received by a receiver in the motor vehicle. The electromagnetic field of the second transmitter merely has the purpose of being superposed on the electromagnetic field of the code generator outside the motor vehicle so that the actual code information cannot be obtained by illegally monitoring the field outside the motor vehicle as said information is not present in a separate form.

In another anti-theft system (EP 0 983 916 A1), the propagation time of the emitted signals is measured in the code generator or in the motor vehicle and locked or unlocked only if the propagation time lies within a predefined value range. The rising or falling edges of the signals must be cleanly detectable here for a reliable propagation time measurement to be possible. With superposed signals this is no longer possible.

In a further anti-theft system (EP 0 848 123 A2), when a pushbutton key on the code generator is actuated a start signal in the radio frequency range is transmitted to the motor vehicle, in response to which the inquiry/response dialog is triggered. The transceiver unit in the motor vehicle and code generator transmit in the same frequency range. There is no overlapping of the signals as the signals there otherwise could not be demodulated satisfactorily and separately from one another. Illegal monitoring and illegal reproduction of the signals is thus easily possible. The anti-theft system is therefore easy to bypass.

SUMMARY OF THE INVENTION

The object of the invention is therefore to provide an improved anti-theft system in which illegal monitoring of the transmitted signals is made more difficult.

This object is achieved according to the invention by a method for operating an anti-theft system having a transceiver unit comprising a trigger unit and a portable code generator, the method comprising the steps of:
  emitting a request signal by the transceiver unit upon activation of the trigger unit,
  emitting a response code signal by the code generator after reception of the request signal, wherein the request signal and the response code signal overlap for a predefined time period.

Another method according to the present invention for operating an anti-theft system for a motor vehicle, wherein the anti-theft system has a transceiver unit in the motor vehicle which, when triggered, emits a request signal, compares a received response signal with a reference code signal, and, when they at least largely correspondend, transmits an enable signal to a security assembly, and a portable code generator which, after reception of a request signal, emits a response code signal, as a result of which authorization of the code generator is confirmed, wherein
  both the transceiver unit and the code generator emit their signals modulated at the same carrier frequency, and wherein
  the transmission periods of the request signal and of the response signal overlap with respect to time.

Here, the dialog between motor vehicle and code generator takes place at the same carrier frequency. In addition, both the vehicle-end transceiver unit and the code generator transmit at certain times (overlapping of transmission phases). As a result, the emitted signals are superposed on one another in these time periods. Anyone who would like to monitor the signals illegally therefore cannot detect from which unit the signals have been transmitted, and therefore can neither assign them nor evaluate the code information contained in them.

The transceiver unit can emit a request signal whose duration is variable. The signals can be transmitted with a carrier frequency of approximately 315 MHz, of approximately 433 MHz or of approximately 868 MHz. The code generator can emit its response code signal a fixed time period after the start of the request signal. Before the request signal, a start signal can be emitted by the transceiver unit, in response to which the code generator responds with a response signal. Furthermore, the transmission of the request signal may start at the latest at the end of the response signal. The request signal and the response signal may also be divided into a plurality of signal pulses and the overlap time period can be variable. The overlap can be arranged such, that the falling edge of a request pulse is overlapped with the rising edge of the response pulse and/or that the falling edge of a response pulse is overlapped with the rising edge of the request pulse.

According to an embodiment of the present invention an anti-theft system for a motor vehicle has a transceiver unit in the motor vehicle, which, when triggered, emits a request signal, then waits for a response code signal and compares the code information item contained in the received response code signal with a predefined reference code information item, and when the two information items at least largely correspond, transmits an enable signal to a security assembly, and a portable code generator, which, after reception of a request signal, emits a response code signal which has a code information item which is characteristic of the code generator, characterized in that the transceiver unit has a signal generator which controls the request signal with respect to time in such a way that it at least partially overlaps with respect to time with the response code signal.

According to another embodiment of the present invention an anti-theft system comprises a transceiver unit comprising a trigger unit and a first transmitter for emitting a request signal upon activation of the trigger unit, a portable code generator comprising a second transmitter for emitting a response code signal after reception of the request signal in such a way that the request signal and the response code signal overlap for a predefined time period.

The first and second transmitter may modulate the request signal and the response signal at the same carrier frequency, for example, with a carrier frequency of approximately 315 MHz, of approximately 433 MHz or of approximately 868 MHz. The second transmitter can transmits the response code signal at a fixed time period after the start of the request signal. The first transmitter before emission of the request signal, may emits a start signal, in response to which the second transmitter responds with a response signal, and the first transmitter may start the request signal at the latest at the end of the response signal.

Other advantages of the present invention may be apparent from the following detailed description of the preferred embodiments.

BRIEF DESCRIPTION OF THE DRAWINGS

Exemplary embodiments of the invention are explained in more detail below with reference to the schematic drawings, in which.

DETAILED DESCRIPTION OF THE PREFERRED EMBODIMENTS

Figure 1:
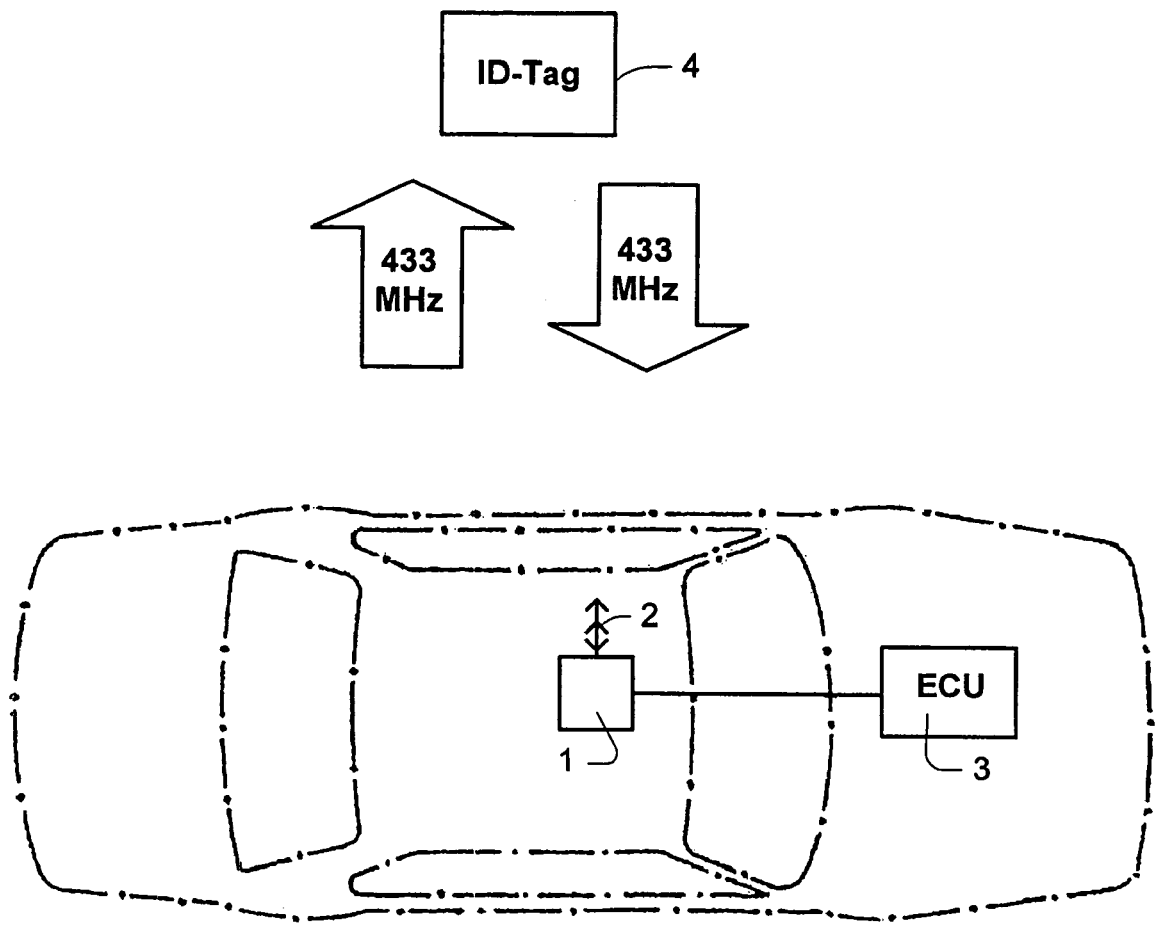
FIG. 1 shows a motor vehicle with an anti-theft system according to the invention.

An anti-theft system for a motor vehicle has a vehicle-end transceiver unit 1 (FIG. 1) which emits and can receive signals via an antenna 2. The transceiver unit 1 is controlled so as to transmit or receive and to modulate or demodulate signals by a control unit 3 (referred to here as ECU). The evaluation of the received signals is preferably carried out in the control unit 3.

In addition, the anti-theft system has a portable code generator 4 (referred to in the figure as ID tag). The code generator 4 contains a user-specific code information item with which the code generator 4 can confirm its authorization for the locking or unlocking of the motor vehicle or for the release of the immobilizer.

If a user manually activates a triggering means, (door handle or switch on, or in the vicinity of, the door handle), a request signal is emitted into the surroundings of the motor vehicle. If a code generator 4 receives the request signal, it, for its part, automatically transmits back a response code signal which contains the code information. If the transceiver unit 1 receives the response code signal, the code information is extracted from it by demodulation and decoding and compared with an anticipated reference code information item in the control unit 3. Given correspondence, an enable signal is generated by means of which a security assembly in the motor vehicle, such as one or more door locks and/or the immobilizer, locks or unlocks.

So that illegal monitoring of the inquiry/response dialog between motor vehicle and code generator 4 is made difficult, the information which is to be emitted by the code generator 4 and by the transceiver unit 1 is modulated with the same carrier frequency (for example 433 MHz here). In addition, as represented schematically and by way of example in FIG. 2, the signals are emitted with respect to time in such a way that the signals of the transceiver unit 1 and the signals of the code generator 4 overlap with respect to time.

Figure 2:
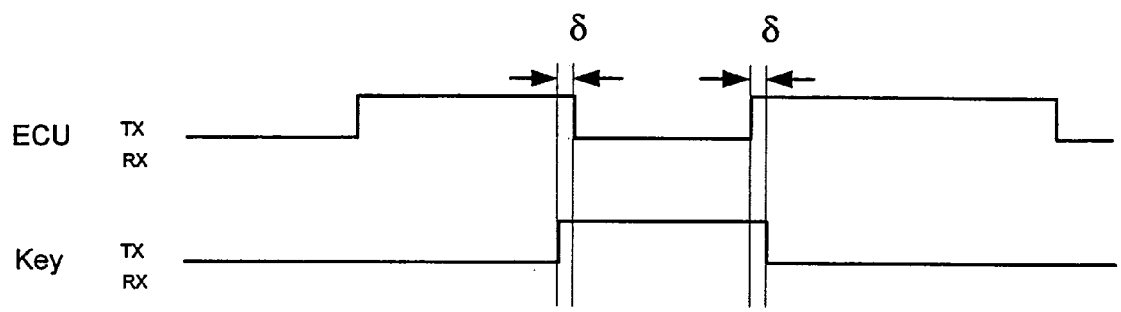
FIGS. 2, 3 and 4 show pulse diagrams of signals which, in the case of the anti-theft system, are transmitted between vehicle and code generator.

In FIG. 2, the transmission signal of the transceiver unit 1 is represented at the top and the transmission signal of the code generator 4 (referred to as key here) is represented at the bottom. The overlapping region with respect to time is designated by $\delta$ here.

The signals do not need to be transmitted as one unit but rather can also be divided into a plurality of pulse trains. Here, the respective other unit transmits when the first unit pauses, and vice versa. At the start and/or at the end of a pulse train, there may be an overlap of the signals, i.e. both the transceiver unit 1 and the code generator 4 transmit within these short time periods (overlapping region $\delta$). As a result, the signals overlap at these times. The data items transmitted at these times can be mixed with one another at a more remote location as a result of the superimposition in such a way that they cannot be received clearly or received in a way in which they can be unambiguously assigned.

For the invention it is important that at least one overlapping region $\delta$ is present during the entire inquiry/response dialog. However, there may also be an overlapping region $\delta$ at each edge of a pulse train. It is also possible for there to be overlapping regions $\delta_1$ and $\delta_2$ of different lengths at the start (rising edge) and at the end (trailing edge) of a pulse train.

So that the relevant data can be received reliably, there is no relevant data present at the start or at the end of a pulse train, only redundant data (dummy data). Since, in any case, transient response or transient decay processes occur at the start of a pulse train or at its end, the overlapping regions $\delta$ prolong the time period for the complete inquiry/response dialog only to an insignificant degree. The actual information which is to be transmitted by the signals is therefore not present in an overlapping region $\delta$ but rather directly adjacent to it.

So that the correct information can also be obtained from the signals, the length of the overlapping regions $\delta$ with respect to time must be known both to the code generator 4 and to the control unit 3. Only then can these extract the information appropriately from the signals and compare it with expected data or information.

The overlapping regions $\delta$ are different for each motor vehicle and each code generator 4. They are set, for example, at the end of the belt when the motor vehicle is being manufactured, during initialization of the anti-theft system. In order to extract the information from the signals, an unauthorized person would have to know the overlapping regions $\delta$ or happen to set the correct overlapping regions $\delta$ during illegal monitoring. This is because an unauthorized person does not know whether the signals which he is illegally monitoring at a particular time originate from the transceiver unit 1 in the motor vehicle or from the code generator 4. In addition, he does not know whether or not the corresponding information is redundant. In addition, the data in the overlapping region is a result of a signal superposition and is therefore falsified in comparison with the original data. Illegal monitoring and unauthorized reproduction are made very difficult in this way.

Only randomly generated data which is redundant for the anti-theft system is transmitted in the overlapping regions δ. These overlapping regions δ should be as short as possible for the entire inquiry and response dialog to be able to take place quickly. As is also explained in more detail below, it is sufficient if the signals just overlap or end/start approximately simultaneously.

As an unauthorized person who would like to monitor the signals illegally must wait until a transmitter has reliably finished transmitting, the unauthorized person requires a pause between the signals. However, the anti-theft system according to the invention does not provide him with one because the transmission of the next signal is already started when the first signal ends. For this reason, the end of the first signal and the simultaneous start of a second signal is also to be understood as an overlap.

Figure 3:
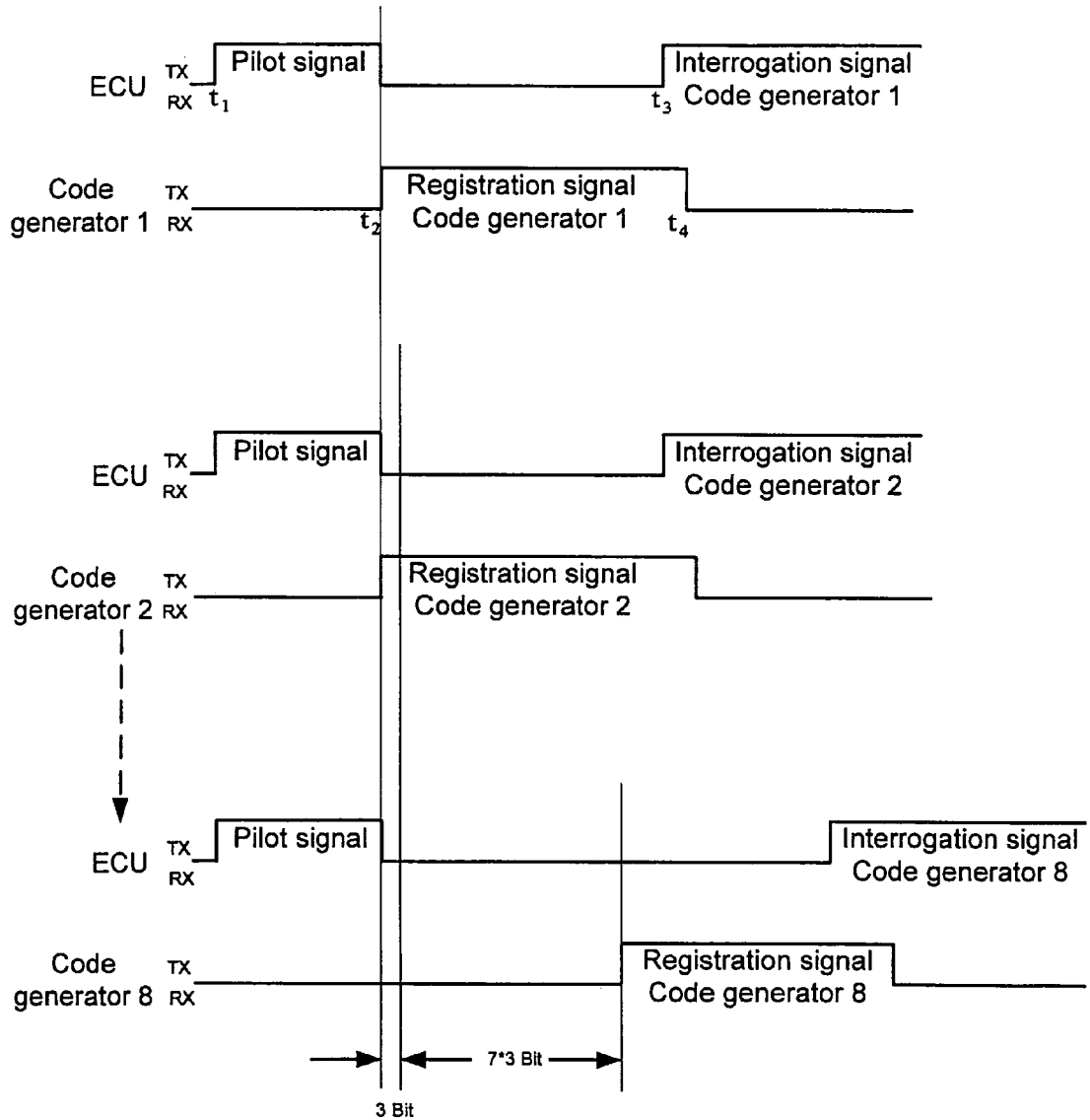

With the anti-theft system, a plurality of code generators 4 can be assigned to the motor vehicle. In FIG. 3, eight code generators 4 are assigned to the motor vehicle. Each code generator 4 is assigned to a priority level with which it can respond to an inquiry by the motor vehicle. Transmission is delayed depending on the priority level.

At first, the transceiver unit 1 transmits, during the time period $t_1$ to $t_2$, a pilot signal with which it would like, for example, to find out which code generators 4 are present in the surroundings of the motor vehicle.

If the first code generator 4 is present with the maximum priority level, at the time $t_2$ it starts without delay its registration signal by means of which it registers itself as present.

As soon as the control unit 3 has detected that a code generator 4 is present (if the first bits of the response code signal are already detected as being associated with the anti-theft system), said quality control unit 3 starts to transmit the interrogation signal at the time $t_3$, as a result of which the code generator 4 is made to transmit back its code information. As the code generator 4 transmits its response code signal up to the time $t_4$, the signals overlap in the overlapping region $\delta=t_4-t_3$.

The same method takes place with the further code generators which are arranged in the vicinity of the motor vehicle and receive the pilot signal. However, these code generators 4 start to transmit the response code signal only after a time which is dependent on their priority level. In the present exemplary embodiment, the time delay—due to the respective priority level of the code generator 4—corresponds to a time period in which three bits of the signal would be transmitted. Thus, for example the eighth code generator transmits 8*3 bits after the end of the pilot signal.

This ensures that lower-ranking code generators 4 "listen to" the higher-ranking ones if they have already begun to emit their signals. Then, the lower-ranking code generators 4 do not even start to transmit the response code signal. As a result, unambiguous assignment to key and code information is possible so that each user accesses the motor vehicle in accordance with his priority level of the code generator 4.

With the code information transmitted by the code generator 4, user-specific information can also be transmitted to the motor vehicle in order to inform the motor vehicle which user is using the motor vehicle. Then, user-specific settings in the motor vehicle, such as adjustment of the seats, of the mirrors, of the air conditioning system, of the engine controller, etc. can be performed.

The individual pulse trains of the respective signals do not need to have a uniform duration, they can also have a different duration whenever they are emitted. The durations can be generated, for example, by means of random generators in transceiver unit 1 and/or code generator 4. So that correct detection of the transmitted code information is possible, the respectively receiving unit is informed of the respective duration in a coded form.

Figure 4:
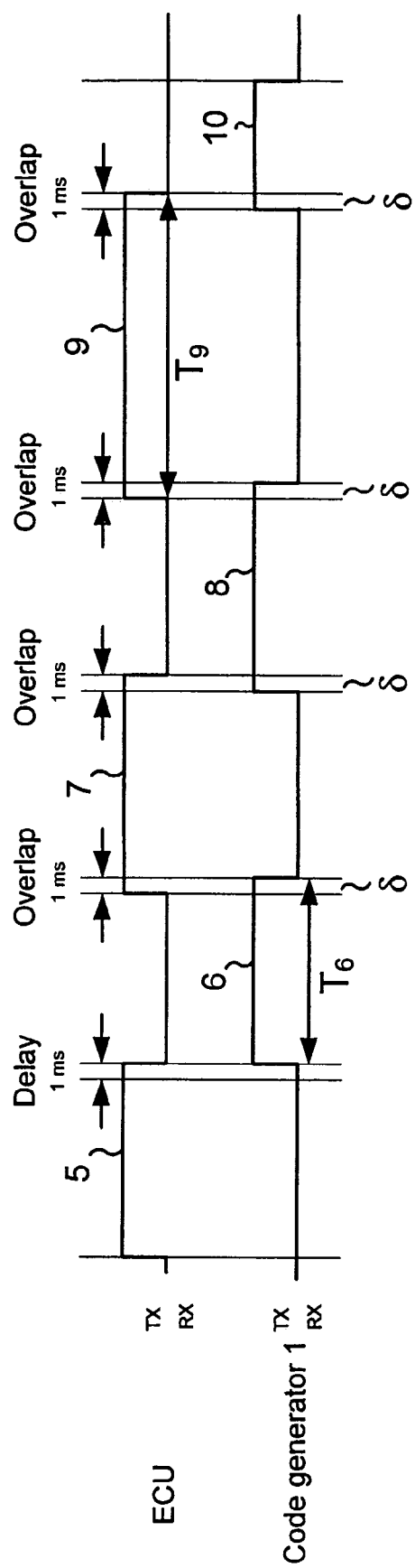

FIG. 4 illustrates by way of example a complete inquiry/response dialog between motor vehicle and code generator 4. Such a dialog takes place at a baud rate of, for example, 16 kbit/s (with respect to the transmitted binary data). The entire communication consequently then lasts approximately 71 ms.

At first, the transceiver unit 1 transmits a first request signal 5 (also referred to as pilot signal or broadcast random signal) with a time period corresponding to the transmission period for 90 bit. This request signal 5 could, for example, contain the interrogation as to which code generators 4 are present in the surroundings.

The end of the start signal 5 is delayed by approximately 1 ms so that the end coincides with the start of a first response code signal 6 of the code generator 4 (a conventional pause between the request signal 5 and first response code signal 6 is therefore not present). As soon as the code generator 4 detects the start of the request signal 5, it waits for a duration which corresponds to the duration of 90 bits until it starts the emission of its first response code signal 6. It therefore begins to transmit the response code signal 6 at the same time as the end of the request signal 5. With the first request code signal 6, the code generator 4 has itself registered, as present for example (also referred to as registration signal or registering key).

The first response code signal 6 is therefore present for approximately 30 bits. As the transceiver unit 1 knows the length of the first response code signal 6, it starts, for its part, the transmission of the second request signal 7 several bits before the first response code signal 6 is ended. There is thus an overlapping region δ, for example of one millisecond here.

After a fixed period of time which refers to the start of the first request signal 5 and is dependent on overlapping regions, pulse intervals and pulse train periods Ti, the transceiver unit 1 starts the transmission of the second request signal 7. In response, the code generator 4 emits a second response code signal 8. It also starts to transmit its response code signal 8 here one millisecond before the end of the second request signal 7. There is therefore also an overlapping region δ of one millisecond here. The code of the registered code generator 4 is interrogated here with the second response code signal 8 in order to confirm authorization.

As an introduction to the ending of the request/response dialog, the transceiver unit 1 emits a third request signal 9 with a random duration of its pulse train. The duration of the pulse train is determined, for example, by a random generator and therefore changes at each emission. The duration is contained as coded information in the request signal 9 and is communicated to the code generator 4 in this way.

The code generator 4 checks, for its part, the actual length or the time of the start of the request signal 9 and places this data in relation to the transmitted value for the duration. Then, for its part, it transmits back a third response code signal 10 in which it confirms to the transceiver unit 1 that the pulse train length of the request signal 9 was correct. The third request signal 9 and third response code signal 10 also overlap by approximately one millisecond.

The code generator 4 is synchronized by reception of the first request signal 5. It is tuned here to the start of the request signal 5, specifically to the rising edge. All further start times of the remaining signals 6 to 10 are then matched to this. Signal propagation times between transceiver unit 1 and code generator 4 are negligibly small compared with the pulse train periods Ti, and therefore play a subordinate role.

The relevant code information is contained essentially in the second response code signal 8. This code information must coincide with a reference code information item which is expected in the control unit 3 and stored there for comparison purposes. Even if the third response code signal 10 also acknowledges the correct length of the pulse train period Ti of the request signal 9, the enable signal is generated in order to lock or unlock the doors or to release the immobilizer.

Only redundant information is contained in the overlapping regions δ. The overlapping regions δ are advantageously different for each anti-theft system of a motor vehicle and are not made known to the outside. In this way, no external party knows the length of the overlapping region δ or those regions within the signals in which encoded information is contained. An unauthorized person who illegally monitors the inquiry/response dialog therefore does not know where he should start to decode the signals and where he should end.

The first response code signal 6 of the code generator 4 can also already contain part of the code information. The code information can therefore be transmitted divided up in many stages on a plurality of pulse trains. In a simple exemplary embodiment, a single pulse train is sufficient as response code signal.

The transmitted signals, such as the request signal or the response code signal, are encoded signals which each have encoded or encrypted information/data. The data to be transmitted is encoded or encrypted in binary form and has a large number of bit places. The more bit places present in the signals, the higher the reliability of the anti-theft system.

Figure 5:
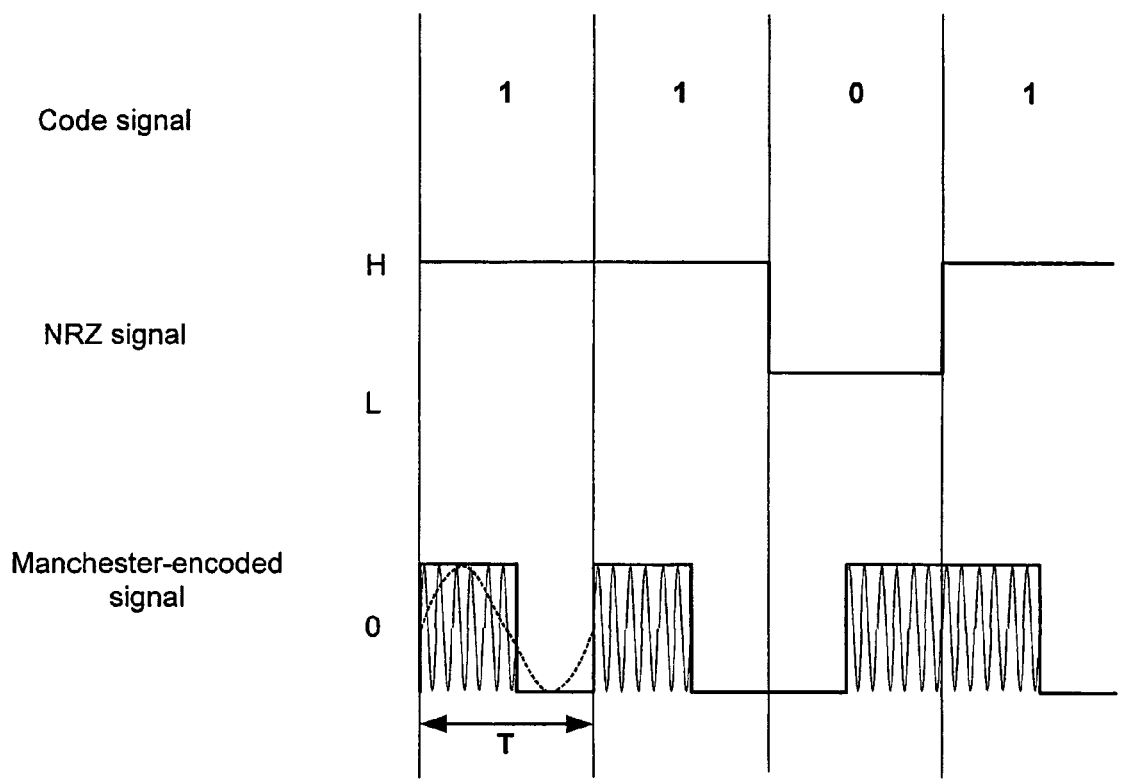
FIG. 5 shows the design of a binary response code signal.

FIG. 5 illustrates part of a binary code information item with the logic values 0 and 1 of the individual bits. This code information can be represented by a NRZ signal (Non Return to Zero) with the logic states H and L for each bit. Such a signal can be presented, for example, in the Manchester code (encoded format). In the Manchester code, a carrier oscillation (which oscillates with the carrier frequency) is keyed within one bit (i.e. within the pulse period T of a single bit) once completely (or even only partially, i.e. with reduced amplitude) and once not at all with regard to the amplitude (also referred to as ON/OFF keying). A signal with the logic value 1 is generated in the first half of the pulse code T by a pulse of the length T/2 while a signal with the value 0 is generated by a pulse of the length T/2 in the second half. The envelope curve which is actually obtained (a square-wave oscillation would be ideal) is represented by a dotted line in a sinuzoidal shape.

This Manchester code has what is referred to as a biphase format which is advantageously used for wireless transmission of signals in motor vehicle technology.

By using the Manchester code, the person who would like to listen in to the signals illegally must wait at least one bit after the end of a signal in order to be able to decide reliably whether or not further bits follow. Only then can he make an assignment as to who has transmitted the corresponding signal and evaluated the respective signal.

It is already sufficient for the invention if the trailing edge of the first signal and rising edge of the second signal are approximately synchronous. This already means an overlap in the case of the Manchester code. The signals are advantageously transmitted over-lapping over a relatively large overlapping region δ. It is therefore very difficult for unauthorized persons to detect the individual signals reliably. In addition, as the period Ti of the pulse trains can change from time to time, the possibility of illegal monitoring and the evaluation of the signals is made more difficult.

As the signals are modulated with the same carrier frequency, it is also possible to use two different receivers in order to select the different signals. Carrier frequencies of 315 MHz, 433 MHz or 868 MHz are advantageously used. Higher frequencies in the GHz region can also be used. However, a precondition is that both the transceiver unit 1 and code generator 4 use the same carrier frequency to modulate the information to be transmitted.

The higher the frequency (and therefore also the baud rate; currently up to approximately 20 kbit/s), the higher the speed with which the entire inquiry/response dialog can take place. The user of the motor vehicle therefore does not notice that a complex, illegal monitoring-proof inquiry/response dialog is taking place between the motor vehicle and code generator 4. Consequently, the user can pull the door handle or activate the triggering switch in order to access the motor vehicle without any loss of convenience. The precondition however is that he carries his authorized code generator 4 with him.

The transceiver unit 1 and the control unit 3 can be accommodated in a common housing. The transceiver unit can have a single transceiver antenna 2. It is also possible for separate transceiver antennas to be arranged in the motor vehicle. The antennas 2 are arranged in such a way that as far as possible all regions in, and in the surroundings of, the motor vehicle are irradiated with a transmission signal.

The term "code generator" is to be understood, irrespective of its external form, as a device which receives a signal and transmits back an encoded signal in response. The code generator may be arranged here on a chip card/check card or in a key grip. The code generator can be used to carry out remote control of a locking system of a motor vehicle and of an immobilizer without using a mechanical key.

The inquiry/response dialog is to be understood as a bidirectional communication between the transceiver unit 1 and the code generator 4 in which a first signal is emitted as a request to respond. The code generator 4 responds automatically to it if it receives the first signal.

What is claimed is:

1. A method for operating an anti-theft system for a motor vehicle, the anti-theft system comprising:
    emitting a first request signal from a transceiver unit in the motor vehicle;
    transmitting a first signal from a portable code generator in response to the first request signal, the transmission of the first response signal starts at the latest at the end of the first request signal;
    comparing the, received first response signal with a reference code signal by the transceiver unit;
    transmitting an enable signal to a security assembly, when the reference code signal and the first response signal at least largely correspond, transmits an enable signal to a security assembly; and
    wherein both the transceiver unit and the code generator emit their respective signals modulated at the same carrier frequency, and the transmission periods of the first request signal and first response signal overlap with respect to time.

2. The method of claim 1, further comprising the first request signal having a variable duration.

3. The method of claim 1, wherein the first request signal and the first response signal are transmitted at a carrier frequency selected from the group consisting of approximately 315 MHz, approximately 433 MHz and approximately 868 MHz.

4. The method as claimed in claim 1, wherein the code generator emits its response signal at a fixed time period after the start of the request signal.

5. The method of claim 1, wherein the overlap of signals comprises only non-relevant data.

6. A method for operating an anti-theft system having a transceiver unit comprising a trigger unit and a portable code generator, the method comprising the steps of:
   emitting a first request signal by the transceiver unit, in response to which the portable code generator responds with a first response signal, transmission of the first response signal starts at the latest at the end of the first request signal;
   emitting a second request signal by the transceiver unit upon receiving the first response signal from the portable code generator; and
   emitting a second response code signal by the portable code generator after reception of the second request signal, wherein the second request signal and the second response code signal overlap for a predefined time period.

7. The method of claim 6, wherein the request signals and the response signals are divided into a plurality of signal pulses.

8. The method as claimed in claim 7, wherein the overlap time period is variable.

9. The method of in claim 6, wherein the request signals and the response signal are modulated at the same carrier frequency.

10. The method as claimed of 6, wherein the request signals and the response signals are transmitted with a carrier frequency selected from the group consisting of approximately 315 MHz, approximately 433 MHz and approximately 868 MHz.

11. The method as claimed in claim 6, wherein the response code signal is transmitted at a fixed time period after the start of the request signal.

12. The method as claimed in claim 6, wherein the falling edge of the request signal is overlapped with the rising edge of the response code signal.

13. The method as claimed in claim 6, wherein the falling edge of the response signal is overlapped with the rising edge of the request signal.

14. The method of claim 6, wherein the overlap of signals comprises non-relevant data.

15. An anti-theft system for a motor vehicle comprising:
   a transceiver unit, said unit when triggered, emits a request signal, waits for a response signal and compares information contained in the received response signal with predefined reference information such that when the information at least largely corresponds, transmits an enable signal to a security assembly, and
   a portable code generator, which, after reception of a request signal, emits the response signal which has information characteristic of the code generator, wherein the transceiver unit has a signal generator which controls the request signal with respect to time so that it at least partially overlaps with respect to time with the response signal whereby only non-relevant data is transmitted during the overlap.

16. The system of claim 15, wherein the request signal and the response signal are modulated at the same carrier frequency.

17. The system of claim 16, wherein the carrier frequency is selected from the group of frequencies consisting of about 315 mHz, about 433 mHz, and about 868 mHz.

18. The system of claim 15, wherein the request signal emitted by the transceiver unit is variable.

19. The system of claim 15, wherein the overlap time period is variable.

20. The system of claim 15 wherein the overlap prevents assigning the signals to either the unit or the generator.

21. The system of claim 15, wherein the falling edge of the response signal overlaps with the rising edge of the request signal.

22. The system of claim 15, wherein the falling edge of the request signal overlaps with the rising edge of the response signal.

23. The system of claim 15, wherein the request signal and the response signal are divided into a plurality of signal pulses.

24. The system of claim 15, wherein the code generator emits its response signal at a fixed period after the start of the request signal.

25. An anti-theft system comprising:
   a transceiver unit comprising a trigger unit and a first transmitter for emitting a request signal upon activation of the trigger unit,
   a portable code generator comprising a second transmitter for emitting a response code signal after reception of the request signal such that the request signal and the response code signal overlap for a predefined time period wherein the first transmitter before emission of the request signal, emits a start signal, in response to which the second transmitter responds with a response signal, and wherein the first transmitter starts the request signal at the latest at the end of the response signal.

26. The system in claim 25, wherein the first and second transmitter modulate the request signal and the response signal at the same carrier frequency.

27. The method as claimed in claim 25, wherein the signals are transmitted with a carrier frequency of approximately 315 MHz, of approximately 433 MHz or of approximately 868 MHz.

28. The system as claimed in claim 25, wherein the second transmitter transmits the response code signal at a fixed time period after the start of the request signal.

29. The system of claim 25, wherein the overlap of signals comprises non-relevant data.

* * * * *